United States Patent
Gosalia

(10) Patent No.: US 11,151,548 B2
(45) Date of Patent: Oct. 19, 2021

(54) LOCATION BASED WALLETS

(71) Applicant: PAYPAL, INC., San Jose, CA (US)

(72) Inventor: Jigar Rajnikant Gosalia, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 292 days.

(21) Appl. No.: 15/855,899

(22) Filed: Dec. 27, 2017

(65) Prior Publication Data
US 2019/0197530 A1  Jun. 27, 2019

(51) Int. Cl.
*G06Q 20/36* (2012.01)
*G06Q 20/32* (2012.01)
*G06F 21/62* (2013.01)

(52) U.S. Cl.
CPC ....... *G06Q 20/3674* (2013.01); *G06F 21/629* (2013.01); *G06Q 20/3224* (2013.01); *G06F 2221/2111* (2013.01); *G06F 2221/2141* (2013.01)

(58) Field of Classification Search
CPC ............ G06Q 20/3674; G06Q 20/3224; G06F 21/629; G06F 2221/2141; G06F 2221/2111
See application file for complete search history.

(56) References Cited

U.S. PATENT DOCUMENTS

| | | | |
|---|---|---|---|
| 10,068,228 B1* | 9/2018 | Winklevoss | H04L 9/085 |
| 10,445,739 B1* | 10/2019 | Sahni | G06Q 20/382 |
| 10,984,411 B1* | 4/2021 | Hayes | G06Q 20/40 |
| 2010/0312657 A1* | 12/2010 | Coulter | G06Q 20/40 705/16 |
| 2013/0144701 A1* | 6/2013 | Kulasooriya | G06Q 30/0253 705/14.24 |
| 2015/0278780 A1* | 10/2015 | Vaidyanathan | G06Q 20/405 705/42 |
| 2016/0094700 A1* | 3/2016 | Lee | H04W 8/245 455/419 |
| 2016/0132864 A1* | 5/2016 | Barrese | G06Q 20/385 382/190 |
| 2016/0180093 A1* | 6/2016 | Goss | G06F 21/57 726/1 |
| 2016/0275492 A1* | 9/2016 | Brickell | G06Q 20/3674 |
| 2017/0032351 A1* | 2/2017 | Burroughs, Jr. | G06Q 20/32 |
| 2018/0189769 A1* | 7/2018 | Narasimhan | G06Q 20/3278 |
| 2019/0109916 A1* | 4/2019 | Varghese | H04L 67/26 |
| 2019/0180285 A1* | 6/2019 | Mittal | G06Q 20/3678 |

* cited by examiner

*Primary Examiner* — Mamon Obeid
*Assistant Examiner* — Chunling Ding
(74) *Attorney, Agent, or Firm* — Haynes and Boone, LLP

(57) ABSTRACT

In response to detecting a request from a first device associated with a first user to utilize a digital wallet associated with a second user, a computer system determines if the first user is authorized to utilize the digital wallet associated with the second user. Further, in response to determining that the first user is authorized to utilize the digital wallet associated with the second user, the computer system allows the first device restricted access to the digital wallet.

15 Claims, 5 Drawing Sheets

LOCATION BASED WALLETS

TECHNICAL FIELD

The present disclosure relates to digital wallets, and more particularly to identifying and/or authorizing the use of one or more digital wallets based on location.

BACKGROUND

Today, with the availability of digital payments by merchants throughout the world, users have the opportunity to pay, using their devices almost anywhere they go. However, in many cases, a digital wallet is typically tied to a single person, and only capable of being utilized by that specific person. Therefore, for a family or a group of siblings, each person may be required to have their own digital wallet containing their own financial instruments in order to perform a digital transaction.

DETAILED DESCRIPTION

Embodiments of the present disclosure provide a system, method, and program product. In response to detecting a request from a first device associated with a first user to utilize a digital wallet associated with a second user, a computer system determines if the first user is authorized to utilize the digital wallet associated with the second user. Further, in response to determining that the first user is authorized to utilize the digital wallet associated with the second user, the computer system allows the first device restricted access to the digital wallet.

In the example embodiment, the present disclosure describes a solution that detects a request received from a user device of a first user to utilize a digital wallet of a second user. Further, the present disclosure describes, in response to detecting the request, performing one or more actions to authenticate if the first user is authorized to utilize the digital wallet of the second user. If the first user is authorized to utilize the digital wallet of the second user, the present solution describes determining, based on location information of the user device of the first user, whether to allow access to the digital wallet.

Furthermore, in the example embodiment, the present disclosure describes a solution for identifying a merchant that corresponds to a transaction being processed or that has been processed via the utilization of a digital wallet. Furthermore, the present disclosure determines if transaction information corresponding to the merchant satisfies one or more transaction requirements (such as a transactional volume, amount, frequency, etc.). If the transaction information corresponding to the merchant satisfies the one or more transaction requirements, the present disclosure creates a correlation between the merchant and a financial instrument (and/or a digital wallet).

Embodiments of the present disclosure will now be described in detail with reference to the accompanying Figures.

Figure 1:
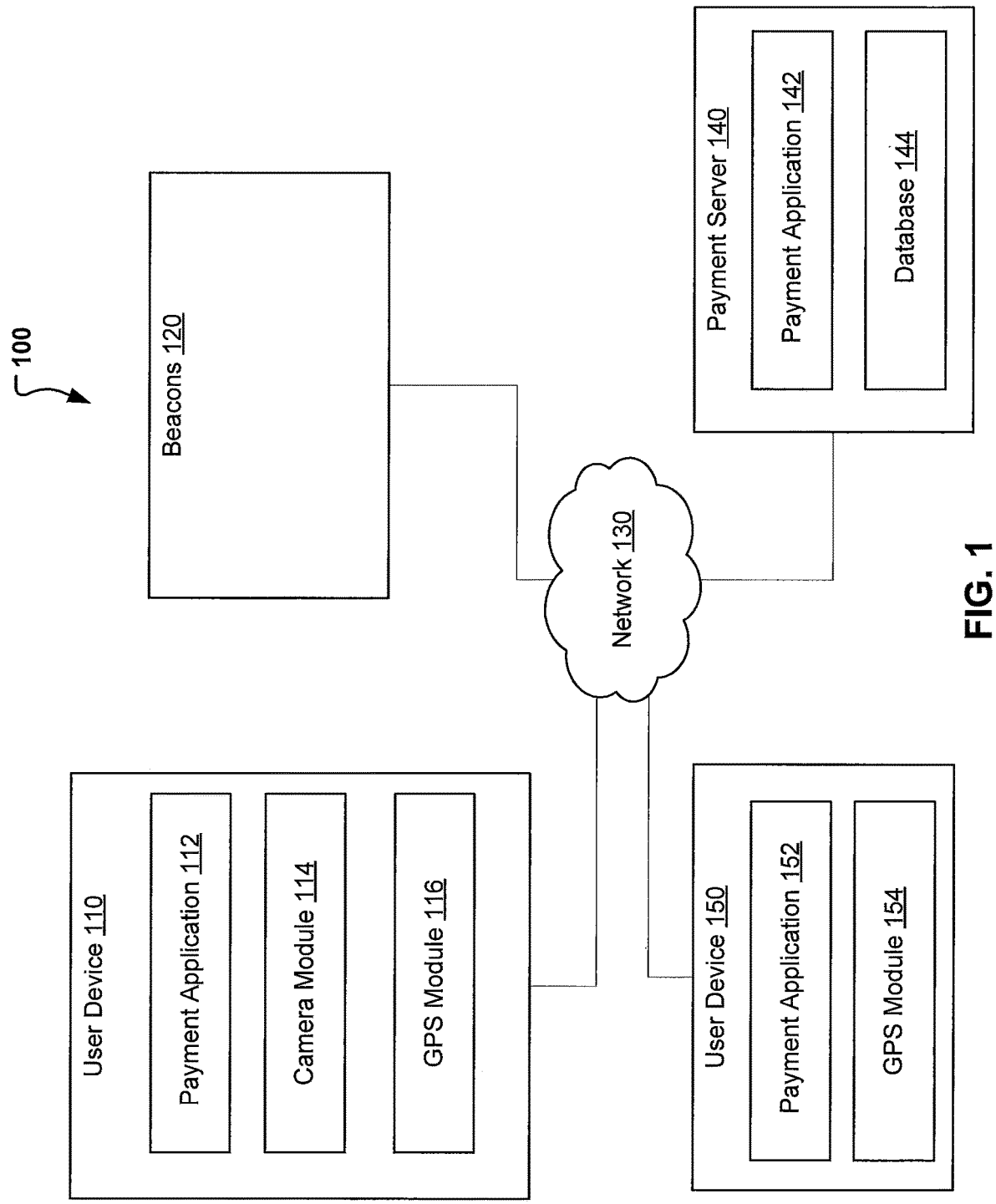
FIG. 1 illustrates digital wallet system, in accordance with an embodiment.

FIG. 1 illustrates digital wallet system 100, in accordance with an embodiment. In the example embodiment, digital wallet system 100 includes user device 110, beacons 120, payment server 140, and user device 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth, a local area network (LAN), or a wide area network (WAN). In general, network 130 can be any combination of connections and protocols that will support communications between computing devices, such as between user device 110 and payment server 140.

In the example embodiment, beacons 120 may include one or more computing devices. In the example embodiment, beacons 120 may be located in one or more merchant locations, and may be capable of connecting with computing devices within a certain vicinity via a Bluetooth Low Energy (BLE) connection or a similar connection. Furthermore, payment server 140 may utilize beacons 120 in order to obtain accurate location information of the computing devices within the vicinity of payment server 140. Furthermore, in the example embodiment, beacons 120 may be a desktop computer, a laptop computer, a tablet computer, a mobile device, a handheld device, a thin client, or any other electronic device or computing system capable of receiving and sending data to and from other computing devices, such as payment server 140, via network 130. Beacons 120 is described in more detail with reference to FIG. 5.

In the example embodiment, user device 150 includes payment application 152 and global positioning system (GPS) module 154. In the example embodiment, user device 150 may be a desktop computer, a laptop computer, a tablet computer, a mobile device, a handheld device, a thin client, or any other electronic device or computing system capable of receiving and sending data to and from other computing devices, such as user device 110, via network 130. User device 150 is described in more detail with reference to FIG. 5.

In the example embodiment, GPS module 154 may be a software component, a hardware component, or a mixture of both. In the example embodiment, GPS module 154 is capable of communicating with one or more GPS satellites, or one or more computing devices (or servers) via network 130, in order to obtain location information corresponding to user device 150. GPS module 154 is described in further detail with regard to FIGS. 2 and 3.

In the example embodiment, payment application 152 is a client-side payment application of server-side payment application 142. In the example embodiment, payment application 152 is capable of receiving user input from the user of user device 150, which may include authentication information, payment details, user information, and the like, and is further capable of transmitting the information to payment application 142 via network 130. In one or more embodiments, the information transmitted by payment application 152 to payment application 142 may be encrypted prior to transmission. Furthermore, based on input received on user device 150, payment application 152 is capable of transmitting, to payment server 140, a request to perform a transaction. Payment application 152 is described in further detail with regard to FIGS. 2 and 3.

In the example embodiment, user device 110 includes payment application 112, camera module 114, and GPS module 116. In the example embodiment, user device 110 may be a desktop computer, a laptop computer, a tablet computer, a mobile device, a handheld device, a thin client, or any other electronic device or computing system capable of receiving and sending data to and from other computing devices, such as payment server 140, via network 130. User device 110 is described in more detail with reference to FIG. 5.

In the example embodiment, GPS module 116 may be a software component, a hardware component, or a mixture of both. In the example embodiment, GPS module 116 is capable of communicating with one or more GPS satellites, or one or more computing devices (or servers) via network 130, in order to obtain location information corresponding to user device 110. Camera module 114 is a component that is capable of capturing an image and/or a video. Furthermore, a user device 110 may include a microphone module that may be utilized to capture audio information in the environment of user device 110. GPS module 116 and camera module 114 are described in further detail with regard to FIGS. 2 and 3.

In the example embodiment, payment application 112 is a client-side payment application of server-side payment application 142. In the example embodiment, payment application 112 is capable of receiving user input from the user of user device 110, which may include authentication information, payment details, user information, and the like, and is further capable of transmitting the information to payment application 142 via network 130. In one or more embodiments, the information transmitted by payment application 112 to payment application 142 may be encrypted prior to transmission. Furthermore, based on input received on user device 110, payment application 112 is capable of transmitting, to payment server 140, a request to perform a transaction. Payment application 112 is described in further detail with regard to FIGS. 2 and 3.

In the example embodiment, payment server 140 includes payment application 142 and database 144. In the example embodiment, payment server 140 may be a desktop computer, a laptop computer, a tablet computer, a mobile device, a handheld device, a thin client, or any other electronic device or computing system capable of receiving and sending data to and from other computing devices, such as user device 110, via network 130. Although not shown, optionally, payment server 140 can comprise a cluster of servers executing the same software to collectively process requests as distributed by a front-end server and a load balancer. Payment server 140 is described in more detail with regard to FIG. 5.

In the example embodiment, database 144 is a storage device that includes information corresponding to one or more users of payment application 142. In the example embodiment, database 144 may include information such as user personal information, user financial information, user preferences, one or more trusted devices associated with each user account, location information corresponding to one or more digital wallets associated with each user account, transactional information, and additional user information. Database 144 is described in further detail with regard to FIG. 5.

In the example embodiment, payment application 142 is a server-side application that is capable of communicating with one or more client-side applications, such as payment application 152 and payment application 112. In addition, payment application 142 is capable of determining whether to allow access to a digital wallet based on analyzing authentication information, and further based on analyzing location information. Furthermore, in the example embodiment, payment application 142 performing the transactions corresponding to transaction requests. Payment application 142 is also capable of creating a correlation between a digital wallet and one or more locations and/or one or more merchants. Payment application 142 is described in further detail with regard to FIGS. 2 and 3.

Figure 2:
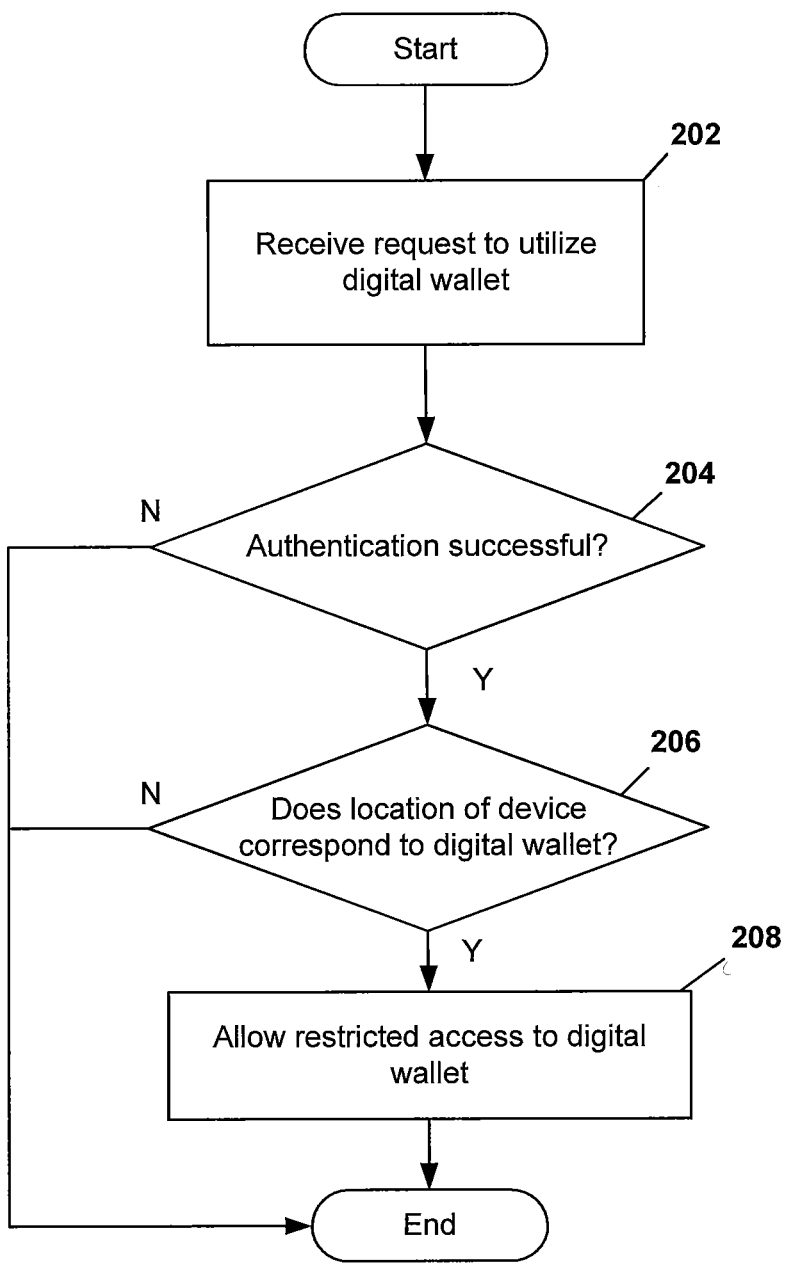
FIG. 2 is a flowchart illustrating the operations of the payment application of FIG. 1 in determining whether to allow a user to access a digital wallet of another user based on analyzing authentication and location information, in accordance with an embodiment.

FIG. 2 is a flowchart illustrating the operations of the payment application 142 in determining whether to allow a user to access a digital wallet of another user based on analyzing authentication and location information, in accordance with an embodiment. In the example embodiment, payment application 142 receives a request from user device 110 to utilize a specific digital wallet associated with an account corresponding to the user of user device 150. In the example embodiment, the request may include user information or one or more identifiers corresponding to the user of user device 110 as well as information corresponding to the utilization of the digital wallet (such as one or more of: location information of user device 110, transactional amount requested, merchant information, information corresponding to the specific digital wallet requested, and information corresponding to the user of user device 150).

In the example embodiment, payment application 142 determines if the user of user device 110 is authorized to utilize the requested digital wallet (decision 204). In the example embodiment, each user account corresponding to a plurality of users of payment application 142 may include information specifying certain trusted users and/or trusted devices. Therefore, in the example embodiment, payment application 142 may reference account information corresponding to the user of user device 150 in database 144 to determine if the user of user device 110 is authorized to utilize the requested digital wallet associated with the account of the user of user device 150. Alternatively, or additionally, payment application 142 may reference database 144 in order to determine if user device 110 is listed as a trusted device for the requested digital wallet associated with the account of the user of user device 150. In the example embodiment, payment application 142 may determine that the user of user device 110 is authorized to utilize the requested digital wallet if payment application 142 determines that the user of user device 110 and/or the user device 11, 0 is listed as a trusted user or trusted device. In additional embodiments, payment application 142 may create a social tree, analyze past transactions, and/or analyze locations corresponding to past transactions to determine a confidence score associated with the user of user device 110 that could identify a level at which the user of user device 110 is related to the user of user device 150. The confidence score may utilized to determine if the user of user device 110 should be authorized to utilize the requested digital wallet (or if the user is a potential fraudster).

In further embodiments, payment application 142 may transmit a notification to user device 110 that contains a specific string of characters (for example via a text message or in-app notification) and further request the specific string of characters be input into payment application 112. If payment application 142 identifies that the correct string of characters has been input and received from payment application 112 via network 130, payment application 142 may determine that the user of user device 110 is authorized to utilize the requested digital wallet (if the correct string is not entered and received, access may be denied). In further embodiments, if payment application 112 is open on user device 110 (and user device 110 is listed as a trusted device for the account associated with the user of user device 150), payment application 112 may scan the text message (or alternative message reception platform) to identify that the notification has been received. Upon identification that the notification has been received, payment application 112 may transmit a message notifying payment application 142 that the notification has been received by user device 110. Upon receiving the message from payment application 112, payment application 142 may determine that the user of user device 110 is authorized to utilize the requested digital wallet. This further embodiment may protect against situations where a hacker may attempt to utilize the account of the user of user device 110 in a fraudulent manner. The hacker may attempt to gain access to the requested digital wallet through the user account of the user of user device 110; however, if the hacker does not have access to user device 110, the hacker may be denied access. For example, if a hacker gains access to the account of the user of user device 110, the hacker may attempt to further attempt to gain access to the aforementioned digital wallet by transmitting a request. The request may prompt a notification with a specific string of characters to be transmitted to user device 110. If the hacker does not have access to user device 110, the hacker will not be able to input the specific string of characters, and therefore, will not be able to gain access to the digital wallet. In further embodiments, authorization of the user may include the user of user device 110 being requested to utilize a fingerprint scanner on user device 110 to verify his/her identity, and/or camera module 114 being utilized in conjunction with facial recognition technology to verify the identity of the user of user device 110.

In other embodiments, payment application 142 may transmit a notification to user device 150 requesting approval to authorize the user of user device 110 and/or approve user device 110 to gain access to utilize the requested digital wallet. If an approval message is received from user device 150, payment application 142 may determine that the user of user device 110 is authorized to utilize the requested digital wallet.

If payment application 142 determines that the user of user device 110 is not authorized to utilize the requested digital wallet (decision 204, "NO" branch), payment application 142 denies access to the requested digital wallet.

If payment application 142 determines that the user of user device 110 is authorized to utilize the requested digital wallet (decision 204, "YES" branch), payment application 142 determines if the location of user device 110 corresponds to a location(s) associated with the requested digital wallet (decision 206). In the example embodiment, a user may have multiple digital wallets associated with his or her account, with each digital wallet including one or more financial instruments, and being associated with one or more locations and/or merchants. The location and/or merchant associated with each respective digital wallet may be input by the user or alternatively may be machine learned by payment application 142 based on the utilization of the digital wallet or financial instrument. For example, if a first digital wallet has been utilized more than a threshold percentage of times at a first merchant; the first digital wallet may be tagged or associated with the first merchant. Alternatively or additionally, other factors such as a transactional volume, a transactional frequency, or a transactional amount with a specific merchant (and/or location) may be taken into account when determining whether to associate a digital wallet with a merchant and/or location. In another example, if a second digital wallet contains multiple financial instruments, payment application 142 may track the usage of each financial instrument, in the manner described above, and divide the second digital wallet into multiple digital wallets with each digital wallet including a financial instrument (or more than one) and each digital wallet being associated with a merchant and/or location. Payment application 142 may store the associations in database 144.

In the example embodiment, beacons 120 may connect with user device 110 and then further relay location information to payment application 142. In the example embodiment, the location information retrieved from beacons 120 may be specific including a point of sale terminal, and/or a specific location within a store. In other embodiments, payment application 112 may utilize GPS module 116 to identify location information associated with user device 110, and further may communicate the location information to payment application 142. Payment application 142 may compare the location information of user device 110 to determine if the location of user device 110 corresponds to a location associated with the requested digital wallet (in database 144). If payment application 142 determines that the location of user device 110 does not correspond to a location(s) associated with the requested digital wallet (decision 206, "NO" branch), payment application 142 may deny access to the requested digital wallet. In further embodiments, payment application 142 may determine location information corresponding to user device 110 via communicating with beacons 120 and directly via communicating with GPS module 116. Payment application 142 may then compare the location determined via beacons 120 and the location determined via payment application 112, and if the locations do not match, then payment application 142 may deny access to the requested digital wallet. For example, if a location cannot be determined via beacons 120, but the location according to payment application 112 is in a location near beacons 120, payment application 142 may determine that a hacker application may be being used to change the actual location of user device 110 to show a different location. Furthermore, payment application 142 may store information corresponding to situations where access was denied, including user information, user device information, account information and the like. Payment application 142 may utilize the stored information in determining fraud for future access requests.

If payment application 142 determines that the location of user device 110 does correspond to the location(s) associated with the requested digital wallet (decision 206, "YES" branch), payment application 142 allows restricted access to the requested digital wallet (step 208). In the example embodiment, allowing restricted access includes providing the user of user device 110 with temporary read only access to the requested digital wallet. In other embodiments, allowing restricted access may include one or more monetary restrictions as to the use of the requested digital wallet or one or more time restrictions as to the use of the requested digital wallet. In further embodiments, allowing restricted access may include creating a one-time use digital wallet or a finite number of use digital wallet that corresponds to the requested digital wallet that may be utilized for a single or finite number of transactions (and may also have specific monetary and temporal restrictions). In one or more embodiments, upon allowing restricted access to the requested digital wallet, payment application 142 may alert the user of user device 150, and may further facilitate a connection between user device 150 and user device 110. For example, the user of user device 150 may be able to utilize payment application 152 to access camera module 114 on user device 110 and watch (and additionally listen to) the transaction as it takes place, and may further have the ability to cancel, alter, or allow a transaction (by the user of user device 110) to take place via the requested digital wallet.

Furthermore, in the example embodiment, the transaction may be performed as the digital wallet owner. Therefore, from a merchant perspective, the transaction would be viewed as being done by the user of user device 150. In other embodiments, the transaction may be performed via the requested digital wallet, but still contain information corresponding to the requestor (user of user device 110) which may be viewable by a merchant (so that a chargeback may be transmitted to the correct entity). In additional embodiments, payment application 142 may not verify location information and may allow restricted access to the digital wallet upon authentication of the user of user device 110. Furthermore, in one or more embodiments, rather than allowing restricted access, payment application 142 may allow full access to one or more digital wallets.

In further embodiments, rather than access to a specific digital wallet being requested by the user of user device 110, as described above, the user of user device 110 may request general access to digital wallets associated with the user of user device 150. Payment application 142 may identify if then utilize location information of user device 110 to determine a specific digital wallet from the one or more digital wallets associated with the user of user device 150 that corresponds to the location of user device 110. Furthermore, payment application 142 may determine if the user of user device 110 is authorized to utilize the specific digital wallet (in the manner described above), and if the user of user device 110 is authorized, may allow restricted access to the specific digital wallet.

Figure 3:
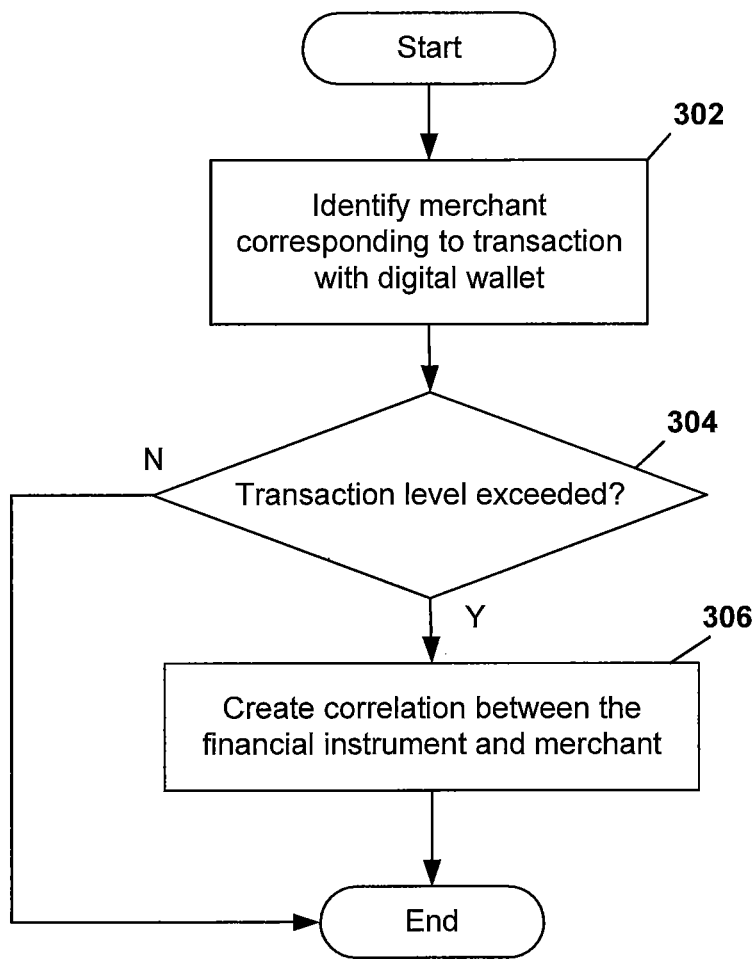
FIG. 3 is an illustration of the payment application of FIG. 1 in identifying whether a performed transaction causes one or more transactional requirements to be satisfied, and if so, creating a correlation between the merchant and a corresponding financial instrument (and/or digital wallet), in accordance with an embodiment.

FIG. 3 is an illustration of the payment application of FIG. 1 in identifying whether a performed transaction causes one or more transactional requirements to be satisfied, and if so, creating a correlation between the merchant and a corresponding financial instrument (and/or digital wallet), in accordance with an embodiment. In the example embodiment, payment application 142 may utilize a client application, such as payment application 152, to identify a merchant corresponding to a transaction currently being performed or recently performed utilizing a digital wallet (step 302). In the example embodiment, upon the user of user device 150 utilizing a digital wallet associated with payment application 152 to initiate a transaction, payment application 152 may communicate details of the transaction to payment application 142 in order to perform the transaction. Furthermore, in the example embodiment, the digital wallet may include multiple financial instruments.

Payment application 142 may determine if the performed transaction causes one or more transaction levels associated with the account of the user of user device 150, to be exceeded. In the example embodiment, the one or more transaction level may include transactional volume levels, transactional frequency levels, transactional amount levels, and/or transactional recency levels (which may be input by the user of user device 150 or an administrator). For example, payment application 142 may determine that the performed transaction causes the total transaction amount corresponding to a first merchant (and a first financial instrument) to be higher than a threshold percentage of the total transactions performed using the specific financial instrument. Based on this determination, payment application 142 may determine that a transactional amount level has been exceeded with regard to the first merchant and the first financial instrument in the digital wallet.

If payment application 142 determines that the performed transaction causes one or more transaction levels associated with the account of the user of user device 150 to be exceeded (decision 304, "NO" branch), payment application 142 continues to monitor for transactions performed using the digital wallet. If payment application 142 determines that the performed transaction causes one or more transaction levels associated with the account of the user of user device 150 to be exceeded (decision 304, "YES" branch), payment application 142 creates a correlation between the financial instrument and the merchant (or location) (step 306). In the example embodiment, as stated above, the digital wallet utilized to perform the transaction may contain multiple financial instruments. Therefore, referring to the example above if payment application 142 determines that the performed transaction causes a transaction amount level to be exceeded, payment application 142 may correlate the first financial instrument in the digital wallet with the first merchant. Further, payment application 142 may correlate the first financial instrument with one or more locations (such as a location associated with the first merchant). Therefore, if at a later time, a transaction within the first merchant location or a transaction corresponding to the first merchant is initiated using the digital wallet, payment application 142 may automatically utilize the first financial instrument. In other embodiments, payment application 142 may divide up the digital wallet utilized (the "master" digital wallet) into multiple digital wallets, each containing a financial instrument. Therefore, referring to the example, creating a correlation between the financial instrument and the merchant may include payment application 142 creating a unique digital wallet containing the first financial instrument and correlating the unique digital wallet with the first merchant. In these other embodiments, if a transaction occurs at a later time, payment application 142 may determine the digital wallet that correlates the merchant being transacted with, and further utilize the determined digital wallet to complete the transaction.

Figure 4:
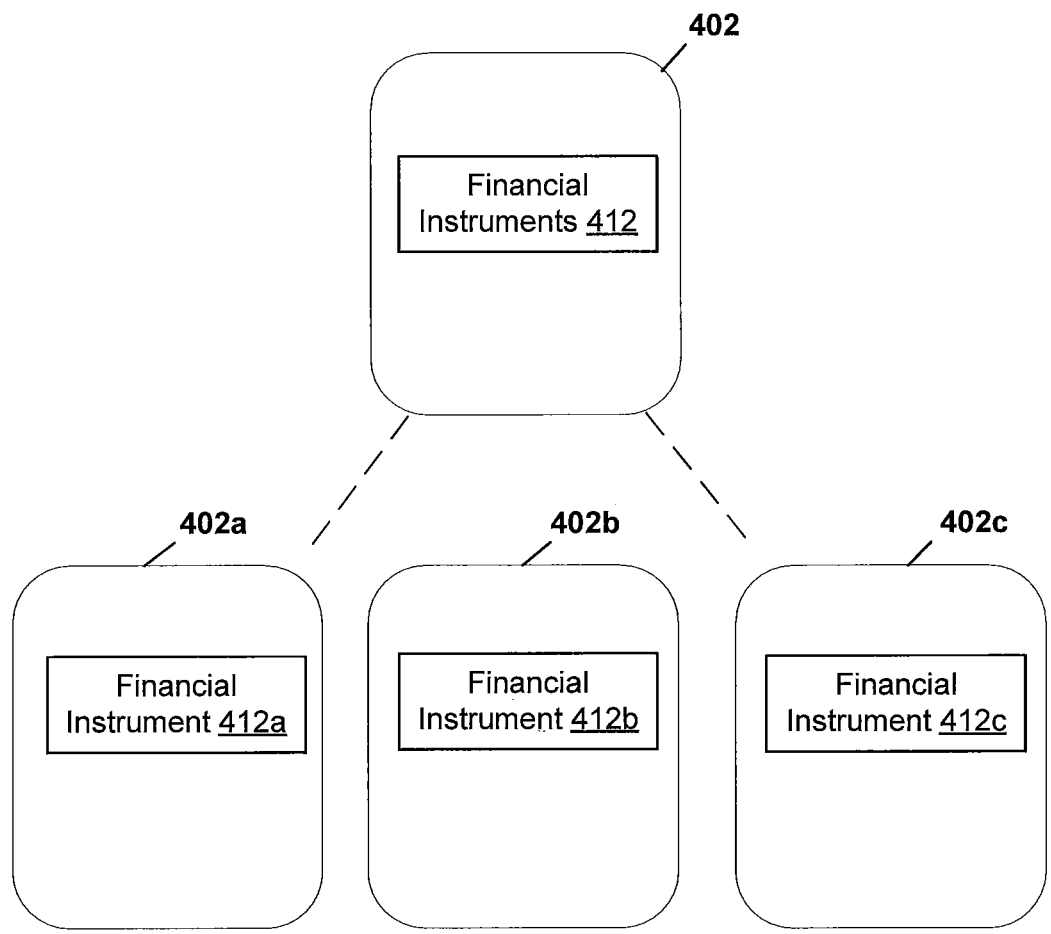
FIG. 4 is an illustration of a plurality of wallets associated with a user, in accordance with an embodiment.

FIG. 4 is an illustration of multiple child digital wallets being created from a single master digital wallet, in accordance with an embodiment. In the example embodiment, FIG. 4 includes master digital wallet 402, child digital wallet 402a, child digital wallet 402b, and child digital wallet 402c. In the example embodiment, master digital wallet 402 includes financial instruments 412 which corresponds to multiple financial instruments. Furthermore, in the example embodiment, each of financial instrument 412a, 412b, and 412c are included within the financial instruments contained in financial instruments 412. FIG. 4 illustrates the operation of payment application 142 creating one or more unique wallets (child digital wallets 402 a through c) from a single master digital wallet, with each child digital wallet including a specific financial instrument (financial instrument 412a, 412b, and 412c). Furthermore, each of the child digital wallets may be correlated with a specific merchant(s) and/or location(s).

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
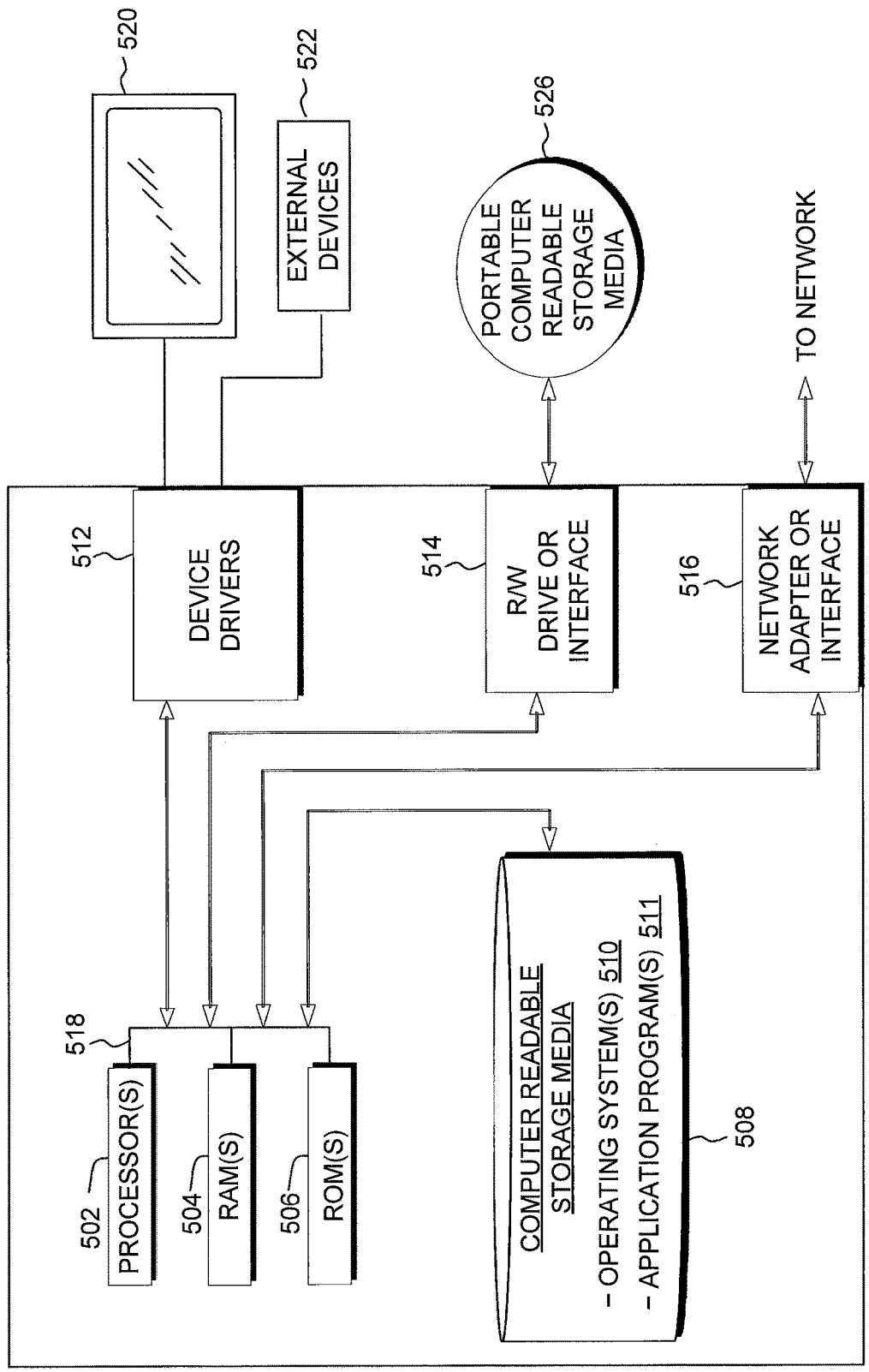
FIG. 5 is a block diagram depicting the hardware components of the digital wallet system of FIG. 1, in accordance with an embodiment.

FIG. 5 depicts a block diagram of components of computing devices contained in digital wallet system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, payment application 142, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory); a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
one or more computer-readable memories storing program instructions; and
one or more processors configured to execute the program instructions to cause the system to perform operations comprising:
receiving a request from a first device associated with a first user to utilize a first digital wallet associated with a second user;
receiving, from the first device through a first network communication pathway, a Global Positioning System (GPS) location of the first device;
in response to the request from the first device associated with the first user to utilize the first digital wallet associated with the second user, identifying a physical location at which the first digital wallet has been pre-authorized to be utilized upon a user authentication;
comparing the GPS location of the first device to the pre-authorized physical location to determine that the GPS location of the first device corresponds to the pre-authorized physical location;
receiving, through a second network communication pathway from a beacon device located at the pre-authorized physical location, an indication that the first device is currently in communication with the beacon device at the pre-authorized physical location;
based on (1) the GPS location corresponding to the pre-authorized physical location and (2) the first device currently in communication with the beacon device at the pre-authorized physical location, authenticating the first user; and
in response to the authenticating the first user based on (1) the GPS location corresponding to the pre-authorized physical location and (2) the first device currently in communication with the beacon device at the pre-authorized physical location:
authorizing the first user to utilize the first digital wallet associated with the second user, wherein the authorizing the first user provides the first device a restricted access to a temporary second digital wallet created based on the first digital wallet; and
establishing a video connection between the first device and a second device associated with the second user, wherein the video connection causes the second device to access a camera of the first device in real-time for a duration of the restricted access to the temporary second digital wallet at the pre-authorized physical location.

2. The computer system of claim 1, the operations further comprising:
in response to determining that a transactional level corresponding to a first merchant and the temporary second digital wallet associated with the second user has been exceeded, creating a correlation between the temporary second digital wallet associated with the second user and the first merchant.

3. The computer system of claim 1, wherein the operations further comprise:
transmitting a notification to the first device that includes a certain sequence of characters;
receiving a message from the first device; and
analyzing the message received to determine if the message includes the certain sequence of characters, wherein the authenticating the first user is further based on the message received including the certain sequence of characters.

4. The computer system of claim 1, wherein the restricted access to the temporary second digital wallet includes allowing a read-only access to the temporary second digital wallet.

5. A non-transitory computer-readable medium storing computer-executable instructions, that in response to execution by one or more hardware processors, causes the one or more hardware processors to perform operations comprising:
receiving a request from a first device associated with a first user to utilize a first digital wallet associated with a second user;
receiving, from the first device through a first network communication pathway, a Global Positioning System (GPS) location of the first device;
in response to detecting the request from the first device associated with the first user to utilize the first digital wallet associated with the second user, identifying a pre-authorized physical location at which the first digital wallet has been pre-authorized to be utilized upon a user authentication;
comparing the GPS location of the first device to the pre-authorized physical location to determine that the GPS location of the first device corresponds to the pre-authorized physical location;
receiving, through a second network communication pathway from a beacon device located at the pre-authorized physical location, an indication that the first device is currently in communication with the beacon device at the pre-authorized physical location;
authenticating the first user based on (1) the GPS location associated with the first device corresponding to the pre-authorized physical location and (2) the first device currently in communication with the beacon device at the pre-authorized physical location; and
in response to the authenticating the first user based on (1) the GPS location associated with the first device corresponding to the pre-authorized physical location and (2) the first device currently in communication with the beacon device at the pre-authorized physical location:
authorizing the first user to utilize the first digital wallet associated with the second user, wherein the authorizing the first user provides the first device a restricted access to a temporary second digital wallet created based on the first digital wallet; and
establishing a video connection between the first device and a second device associated with the second user, wherein the video connection causes the second device to access a camera of the first device in real-time for a duration of the restricted access to the temporary second digital wallet at the pre-authorized physical location.

6. The non-transitory computer-readable medium of claim 5, the operations further comprising:
in response to determining that a transactional level corresponding to a first merchant and the temporary second digital wallet associated with the second user has been exceeded, creating a correlation between the temporary second digital wallet associated with the second user and the first merchant.

7. The non-transitory computer-readable medium of claim 5, wherein the pre-authorized physical location associated with the first digital wallet is one location of one or more locations corresponding to a first merchant.

8. The non-transitory computer-readable medium of claim 6, wherein the creating a correlation between the temporary second digital wallet associated with the second user and the first merchant includes creating another digital wallet that includes a financial instrument utilized in a transaction that caused the transaction level to be exceeded, and correlating the another digital wallet with the first merchant.

9. The non-transitory computer-readable medium of claim 5, wherein the operations further comprise:
transmitting a notification to the first device that includes a certain sequence of characters;
receiving a message from the first device; and
analyzing the message received to determine if the message includes the certain sequence of characters, wherein the authenticating the first user is further based on the message received including the certain sequence of characters.

10. The non-transitory computer-readable medium of claim 5, wherein the restricted access to the temporary second digital wallet includes a read-only access to the temporary second digital wallet.

11. A method, comprising:
identifying a merchant corresponding to a transaction utilizing a financial instrument in a first digital wallet associated with a second user;
in response to determining that the transaction has caused a transaction level to be exceeded, creating a correlation between the first digital wallet associated with the second user and one or more locations corresponding to the merchant;
in response to detecting a request from a first device associated with a first user to utilize the first digital wallet associated with the second user, identifying a physical location at which the first digital wallet has been pre-authorized to be utilized upon a user authentication;
receiving, from the first device through a first network communication pathway, a Global Positioning System (GPS) location of the first device;
comparing the GPS location of the first device to the pre-authorized physical location to determine that the GPS location of the first device corresponds to the pre-authorized physical location;
receiving, through a second network communication pathway from a beacon device located at the pre-authorized physical location, an indication that the first device is currently in communication with the beacon device at the pre-authorized physical location;
based on (1) the GPS location corresponding to the pre-authorized physical location and (2) the first device currently in communication with the beacon device at the pre-authorized physical location, authenticating the first user; and in response to the authenticating the first user based on (1) the GPS location corresponding to the pre-authorized physical location and (2) the first device currently in communication with the beacon device at the pre-authorized physical location:
- authorizing the first user to utilize the first digital wallet associated with the second user, wherein the authorizing the first user provides the first device a restricted access to a temporary second digital wallet created based on the first digital wallet; and
- establishing a video connection between the first device and a second device associated with the second user, wherein the video connection causes the second device to access a camera of the first device in real-time for a duration of the restricted access to the temporary second digital wallet at the pre-authorized physical location.

12. The method of claim 11, wherein the pre-authorized physical location is one location of one or more locations corresponding to the merchant.

13. The method of claim 11, further comprising:
transmitting a notification to the first device that includes a certain sequence of characters;
receiving a message from the first device; and
analyzing the message received to determine if the message includes the certain sequence of characters, wherein the authenticating the first user is further based on the message received including the certain sequence of characters.

14. The method of claim 11, wherein the restricted access to the temporary second digital wallet includes allowing a read-only access to the temporary second digital wallet.

15. The method of claim 14, wherein the read-only access to the temporary second digital wallet is a read-only access to a subset of financial instruments of the temporary second digital wallet, wherein the subset of financial instruments corresponds to the pre-authorized location.

* * * * *